(No Model.)
B. F. HANCOCK.
FERTILIZER DISTRIBUTER.
No. 368,945. Patented Aug. 30, 1887.
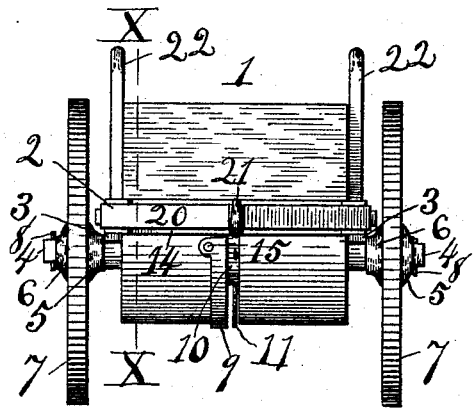
Fig. II
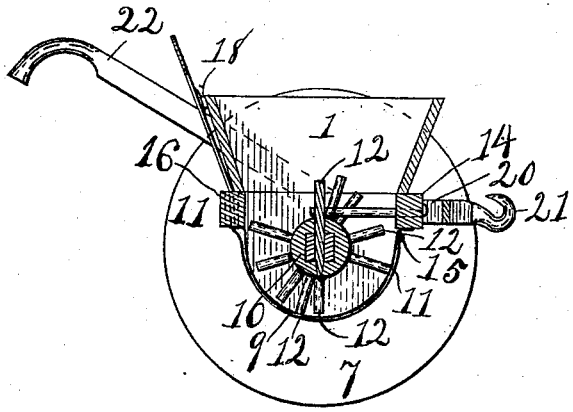
Fig. I
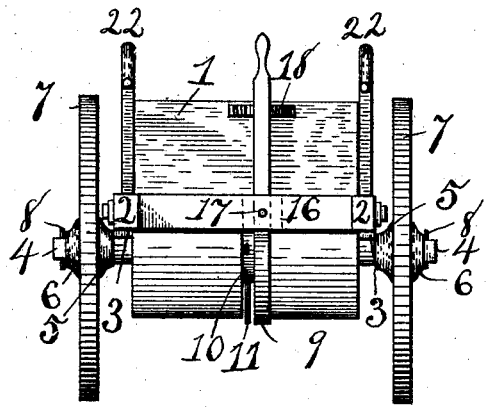
Fig. III
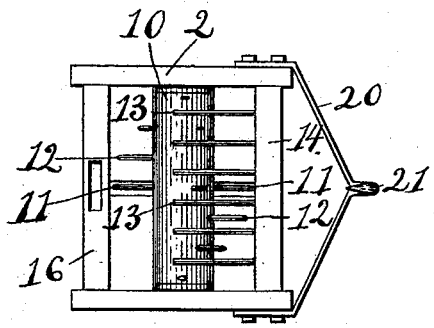
Fig. IV
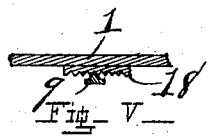
Fig. V
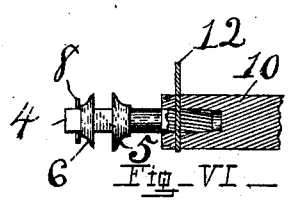
Fig. VI
Witnesses
A. P. Wood
Ned P. Wood
Inventor
Benjamin F. Hancock
By his Att'y Albert A. Wood
N. PETERS, Photo-Lithographer, Washington, D. C.

UNITED STATES PATENT OFFICE.

BENJAMIN F. HANCOCK, OF LITTLEVILLE, GEORGIA.

FERTILIZER-DISTRIBUTER.

SPECIFICATION forming part of Letters Patent No. 368,945, dated August 30, 1887.

Application filed November 20, 1886. Serial No. 219,744. (No model.)

*To all whom it may concern:*

Be it known that I, BENJAMIN F. HANCOCK, a citizen of the United States, residing at Littleville, in the county of Clayton and State of Georgia, have invented a new and useful Fertilizer-Distributer; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to fertilizer-distributers, the object being to produce a machine that will distribute fertilizers in a furrow and that will be cheap in its construction and efficient in its operation.

It consists of two wheels attached to a revolving axle in which radial teeth are set spirally and stationary teeth set in the frame in such a way as to pulverize the fertilizer and prevent clogging. It also has a concave bottom which has a slit across it, through which the central teeth on the cylinder pass, and a swinging gate whereby the width of this slit is regulated. It is also provided with a hook for attaching the motive power and handles for guiding it, as will be hereinafter fully described.

In the accompanying drawings, Figure I is a vertical section through the machine on the line X X, Fig. II, showing the interior of the machine, and especially the manner of fastening the iron journals into the wooden cylinder. Fig. II is a front view showing one hinge of the gate and other details. Fig. III is a rear view showing the gate and the handle by which it is operated. Fig. IV is a top view of the frame and stationary teeth, also the cylinder and its teeth. Fig. V is a section near the top of the back side of the hopper, showing the lever and notches that hold the gate in any desired position as regards the width of the discharge-opening. Fig. VI is a longitudinal section of one end of the cylinder, further illustrating the manner of putting the journals into the cylinder.

In the figures, like reference-marks referring to like parts, 1 is the hopper, the bottom of which has the same interior dimensions as the frame 2, to which it is attached. The frame is carried by the boxes 3 on the journals of the axle 4. On the journals which form part of the axle 4 are the collars 5 and 6, between which are clamped the wheels 7, the collars 6 being secured by the pins 8. The central portion of the axle consists of a cylinder, 10, preferably of wood, in which are set the teeth 11 and 12, the teeth 11 being set in a circumferential row and the teeth 12 being set in a spiral row around the axle. The teeth 11 project slightly through the slit in the concave at the bottom, while the teeth 12 run inside the concave, and all are arranged to pass, as shown, through the stationary teeth 13, which are inserted in the front cross-piece of the frame. One tooth or more in each end of the cylinder passes entirely through the same for the purpose of holding the journals in their place in the cylinder. To the front and on the outside of the concave is attached by the pivot 15 the gate 9, which is a thin strip of metal passing around the outside of the concave and at the back through a mortise in the cross-piece 16 of the frame, where it swings on the pivot 17, as in Fig. III, and extends upwardly at the back of the hopper and is provided with an edge projection that engages with the notched piece 18, that is attached to the hopper. To the front of the frame is bolted the bail 20, having the hook 21. To the sides of the hopper and extending rearwardly are the handles 22.

The operation of my device is as follows: The fertilizer is placed in the hopper 1 and is kept stirred up and forced through the slit in the concave as fast as desired by the teeth 11 in the cylinder, that project slightly through the opening in the concave. The stationary teeth 13 are so placed that the outer end of each one rests on the cylinder 10, thus placing them in such a relative position to the teeth 11 and 12 that these teeth 11 and 12 have a shearing cut as they pass through the teeth 13. This cut, being shearing, causes the larger foreign matter—consisting of sticks, stones, &c.—to be thrown toward the front of the hopper and out of the way of the teeth as they pass. In case anything gets caught between the teeth 11 and 12 and the teeth 13 the latter cannot be bent down, as the material so placed will stop the machine before sufficient power can be applied to bend them, owing to the support afforded by their contact with the cylinder 10.

Owing to the adjustability of the slit in the concave by the gate, as described, any kind of fertilizer can be distributed, whether fine or coarse, wet or dry.

I am aware that it is not new to construct fertilizer-distributers with a hopper having a semicircular bottom and containing a toothed cylinder, the revolution of which carries the contents of the hopper to the slit or opening through which it passes to the furrow or other place of deposit; and I do not, therefore, broadly claim a fertilizer-distributer so constructed. In my device I am enabled to run straight ahead when the line of draft is at an angle to the row by a slight application of force to the handles in the rear of the machine to keep it to its course and counteract the slight tendency of the motive power to pull it to one side, which enables the machine to be run up to any obstacle or to the end of the row.

Having thus described my invention, what I claim as new, and desire to secure by Letters Patent of the United States, is—

In a fertilizer-distributer, a semicircular bottom through which is a cross-slit, in combination with the cylinder 10, the journals of which are fastened therein by the teeth 12, and the inwardly-projecting teeth 13, adapted to have their extremities rest upon the top of cylinder 10, for the purpose specified, all the parts being arranged as shown and described.

In testimony whereof I affix my signature in presence of two witnesses.

BENJAMIN F. HANCOCK.

Witnesses:
A. P. WOOD,
J. H. JONES.